(12) United States Patent
Franz

(10) Patent No.: US 7,609,857 B2
(45) Date of Patent: Oct. 27, 2009

(54) METHOD AND DEVICE FOR RECOGNIZING OBSTRUCTION OF VIEW IN IMAGE SENSOR SYSTEMS

(75) Inventor: Matthias Franz, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 10/501,253

(22) PCT Filed: Nov. 22, 2002

(86) PCT No.: PCT/DE02/04290

§ 371 (c)(1),
(2), (4) Date: Jun. 9, 2005

(87) PCT Pub. No.: WO03/060826

PCT Pub. Date: Jul. 24, 2003

(65) Prior Publication Data

US 2005/0254688 A1    Nov. 17, 2005

(30) Foreign Application Priority Data

Jan. 17, 2002    (DE) ................................ 102 01 522

(51) Int. Cl.
*G06K 9/00* (2006.01)
*H01L 27/00* (2006.01)
*H02P 5/00* (2006.01)

(52) U.S. Cl. .................... 382/104; 250/208.1; 318/444

(58) Field of Classification Search .................. 382/104
See application file for complete search history.

(56) References Cited

U.S. PATENT DOCUMENTS

| | | |
|---|---|---|
| 4,350,884 A | 9/1982 | Vollath |
| 5,170,202 A | 12/1992 | Bell |
| 5,923,027 A * | 7/1999 | Stam et al. ............... 250/208.1 |
| 6,020,704 A * | 2/2000 | Buschur ..................... 318/483 |
| 6,097,024 A * | 8/2000 | Stam et al. ............... 250/208.1 |
| 6,160,369 A * | 12/2000 | Chen .......................... 318/444 |
| 6,262,410 B1 * | 7/2001 | Stam et al. ............... 250/208.1 |
| 6,404,490 B2 * | 6/2002 | Blasing ................... 356/239.8 |
| 6,555,804 B1 * | 4/2003 | Blasing ................... 250/208.1 |
| 6,596,978 B2 * | 7/2003 | Hochstein ................ 250/208.1 |
| 6,841,767 B2 * | 1/2005 | Mindl et al. ............. 250/208.1 |
| 2006/0163458 A1 * | 7/2006 | Reime ................... 250/227.25 |
| 2006/0228001 A1 * | 10/2006 | Tsukamoto ................. 382/104 |
| 2007/0267993 A1 * | 11/2007 | Leleve et al. ............... 318/483 |

FOREIGN PATENT DOCUMENTS

| | | |
|---|---|---|
| DE | 101 04 734 | 8/2002 |
| JP | 1-274213 | 11/1989 |
| JP | 04303047 | 10/1991 |
| JP | 11126248 | 5/1999 |
| JP | 2001018762 | 5/2000 |
| JP | 2000-207563 | 7/2000 |
| JP | 2001-092979 | 4/2001 |
| JP | 2001516670 T | 10/2001 |

* cited by examiner

*Primary Examiner*—Bhavesh M Mehta
*Assistant Examiner*—David P Rashid
(74) *Attorney, Agent, or Firm*—Kenyon & Kenyon LLP

(57) ABSTRACT

A method and a device for recognizing visual obstructions in image sensor systems are provided. A signal is produced, based on the analysis of the recorded image from the image sensor, which indicates the presence and, optionally, the type, of the visual obstruction on a windshield, for example.

20 Claims, 2 Drawing Sheets

METHOD AND DEVICE FOR RECOGNIZING OBSTRUCTION OF VIEW IN IMAGE SENSOR SYSTEMS

This application was filed as PCT/DE02/04290 on Nov. 22, 2002, and claims the foreign priority benefits under 35 U.S.C. § 119 of German Patent Application No. 102 01 552.8, which was filed Jan. 17, 2002 in the Federal Republic of Germany.

FIELD OF THE INVENTION

The present invention relates to a method and a device for recognizing visual obstructions in image sensor systems.

BACKGROUND INFORMATION

In the future, in particular in conjunction with environmental sensing of motor vehicles, image sensors such as video cameras, for example, may be used whose image is evaluated by downstream functions (driver assistance functions, for example). It is therefore of particular importance to recognize visual obstructions which degrade the image detected by the image sensor, to inform the downstream functions or systems of the presence of such visual obstructions, and to initiate countermeasures, if necessary.

SUMMARY OF THE INVENTION

The detection of the blurriness of the recorded image results in a suitable method which assists in recognizing visual obstructions. Downstream systems or functions, which function properly only when the view is adequate, may be informed of the presence of the visual obstruction and are thus able to initiate suitable countermeasures. When a visual obstruction is recognized, depending on the configuration of the downstream function or system, the recorded image is not evaluated or corrected, or other suitable measures, such as switching on the windshield wiper system or windshield heating, for example, are performed.

Visual obstructions may be recognized based on the image signal itself, so that no additional sensors are necessary. The method is suitable in particular for recognizing a visual obstruction on the windshield of the motor vehicle.

The image sensor assumes additional functions, such as the function of a rain sensor, for example, so that this additional rain sensor may be dispensed with in the vehicle with such image sensor-based driver assistance functions, for example lane monitoring systems.

The method described below may be used in video sensor systems in motor vehicles, which systems are not focused on the vehicle windshield, but rather on the external region. The method described below may thus be used in conjunction with the sensing of the environment around a motor vehicle. In this manner the image sensor may be used for multiple applications (for example, rain sensor and object detection, etc.).

The image sensor may be able to check its functionality using its own output signal, i.e., determine whether the instantaneous view conditions are sufficient for the next function that is to be performed. When the image sensor is not functioning properly, this is signaled to the driver or the downstream system, and/or countermeasures are taken.

The detection of visual obstructions may be performed by measuring the blurriness of the represented image. A reliable method may be provided for determining visual obstructions, in particular objects on a vehicle windshield, which appear blurry in the image. Transparent objects such as raindrops, or semitransparent objects such as ice or dust, for example, may be recognized, and in one exemplary embodiment even distinguished from one another, by measuring the blurriness of the image.

Thus, information may be obtained about the type of visual obstructions. In this manner, a response specific to the particular type of visual obstruction may be made, for example by automatically switching on the windshield washer system when the windshield is soiled by particles.

DETAILED DESCRIPTION

Figure 1:
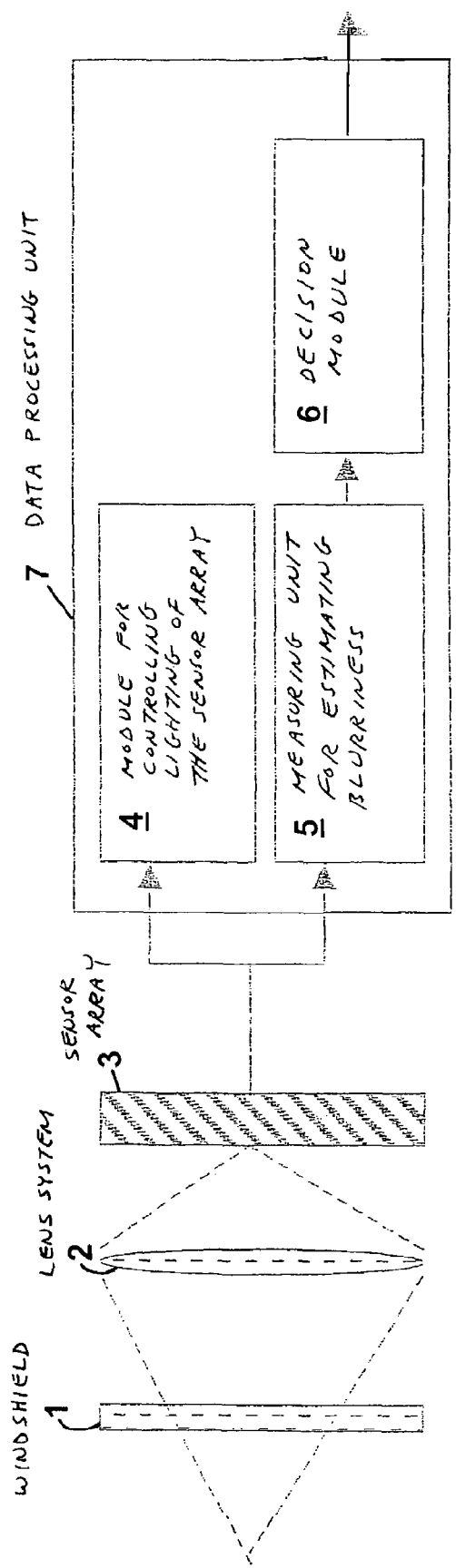
FIG. 1 shows a schematic illustration of an image sensor system by which a method according to the present invention for determining visual obstructions is implemented.

The image sensor system illustrated in FIG. 1 includes an optical sensor array 3 which is connected to a data processing unit (or an evaluation unit) 7, for example a microprocessor. The instantaneously visible scene is mapped onto the sensor array 3 by a lens system 2. The image sensor is mounted behind a windshield 1 and is focused on an external region beyond the windshield. The windshield is, for example, the window glass of a vehicle, in particular the windshield of the vehicle. The focusing on the vehicle's external region allows the image sensor system to also be used for other image processing operations such as lane detection or obstruction detection, for example. Evaluation unit 7 includes a module 4 for controlling lighting of the sensor array, a measuring unit 5 for estimating blurriness, and a decision module 6 which makes decisions regarding the presence and, optionally, the type, of a visual obstruction. In one exemplary embodiment all of these modules are part of a microprocessor, the modules being implemented as software programs. In other exemplary embodiments, the modules are individual components (processors), implemented as software, where estimations of blurriness are made, for example, in one component and decisions are made in another component. The decision made by decision module 6 is then relayed as an information and/or activation signal to downstream functions and/or systems.

The automatic detection of visual obstructions on the windshields of a vehicle plays an important role due to the fact that, when image sensors are used in the vehicle, systems which evaluate the images from the sensor function properly only when the view is adequate. If there is information about the visual obstruction and, in the ideal case, about the type of visual obstruction, such a system is able to display to the driver its instantaneous lack of functionality and/or to take countermeasures, such as switching on the wiper system, the windshield heating system, or the windshield washer system, for example.

When visual obstructions are determined based solely on the image sensor signal, the problem arises that visual obstructions on a vehicle windshield are made noticeable in the image only indirectly, since in driver assistance systems the image sensor is focused on the vehicle's external region. Objects on the windshield, for example raindrops or dust, are therefore blurrily imaged. These visual obstructions are thus made noticeable by a characteristic distribution of the blurriness in the image signal.

The detection of visual obstructions is based on measuring the blurriness of the image which is recorded by an image sensor. This blurriness is made noticeable by a lack of sharpness of the imaged contours of the instantaneously visible scene. Objects present on the windshield are blurrily imaged due to the focusing of the image sensor on the external region. Transparent objects, such as raindrops, for example, result in localized defocusing of the image, and semitransparent objects such as ice or dust scatter incident light beams. Both effects result in an increase in the blurriness of the sensor signal. The evaluation unit which is associated with the image sensor, an optical sensor array of, for example, a CCD or CMOS camera, detects the distribution of blurriness of the instantaneously imaged scene. Based on the detected distribution of blurriness, a conclusion is drawn as to the presence of a visual obstruction. The methods for digital image processing described below may be used for determining the blurriness.

In one exemplary embodiment, the image sensor is a sensor array which assists in obtaining information also on the type of visual obstruction. This fundamentally distinguishes such a sensor array from a conventional rain sensor which operates by the reflection principle. The use of a sensor array allows a specific response to be initiated in response to the determined visual obstruction by, for example, by additionally switching on a windshield washer system for washing soiling caused by particles. One exemplary method for recognizing the type of visual obstruction is described in detail below.

Figure 2A:
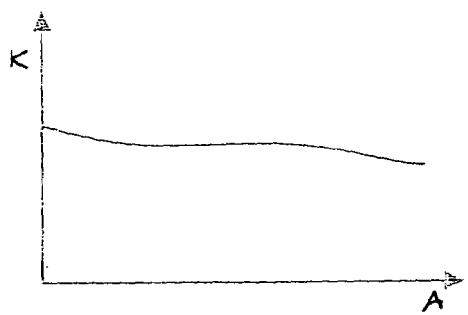
FIGS. 2a and 2b show charts illustrating an exemplary embodiment of the method for determining the blurriness in the image and the recognition of visual obstructions derived therefrom.
Figure 2B:
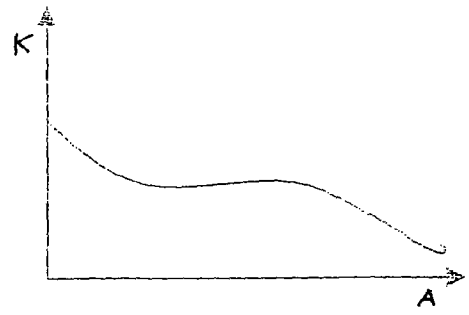

A first possibility for measuring blurriness is illustrated with reference to the diagrams in FIGS. 2a and 2b. Blurriness is measured here using the contrast spectrum. The underlying principle of this method is known from the field of digital image processing. To obtain the contact spectrum, first a multiscale analysis is performed, in which the video image is decomposed into multiple images of decreasing resolution by the repeated use of a smoothing operation and subsequent subsampling. A global measure of contrast, for example the standard deviation of the intensity values in the image, is calculated in each resolution stage. The measure of contrast plotted as a function of the resolution forms the contrast spectrum of the image. Examples of such contrast spectra are shown in FIGS. 2a and 2b. In these figures, the particular measure of contrast K of the image is plotted as a function of resolution A. Sharp and blurry images differ in their contrast spectra by the fact that the drop in contrast as a function of increasing resolution is steeper in blurry images than in sharp images. This is because fine details are degraded more strongly by visual obstructions than are coarse image features. Thus, the drop in the contrast spectrum is a measure of the blurriness of the image. FIG. 2a illustrates a contrast spectrum as a function of the image resolution for an image with slight blurriness, while FIG. 2b shows the situation for high image blurriness (blurry image).

In one implementation of the method for determining the blurriness of the image, the contrast spectrum is recorded by multiscale analysis within a computing program, and a variable is determined, for example the average increase in the measure of contrast as a function of the resolution, which characterizes the variation of the measure of contrast as a function of the resolution. The blurriness of the image is determined by comparing this variable to at least one limiting value. For recognizing a visual obstruction, in particular with regard to the response measures planned in the downstream systems, it is sufficient to determine that the image is blurry. Thus, the determined variable is compared to a limiting value, and if this limiting value is exceeded, blurriness may be assumed, or the variable itself is relayed as a measure of blurriness. In other applications, determining a measure of the blurriness may be desired. In these cases, limiting values form ranges for the variable which characterizes the contrast spectrum and to which blurriness values are assigned. A value for the magnitude of the blurriness is determined when the value characterizing the contrast spectrum is in a specified range of values.

In addition to measuring the blurriness by using the contrast spectrum, there are a number of other methods from the field of digital image processing that may be used to detect blurriness. Examples of such alternative methods for measuring the image blurriness are measures for analyzing the Fourier spectrum or the autocorrelation of the analyzed image. In the Fourier spectrum a blurry image is characterized by the fact that the amplitudes of the high spatial frequencies, which represent the finer image details, are strongly attenuated in comparison to a sharp image.

Figure 3A:
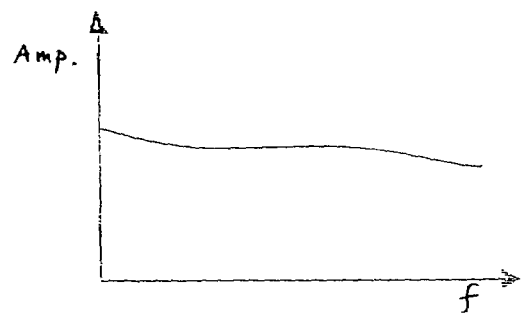
FIGS. 3a and 3b show charts illustrating another exemplary embodiment of the method for determining the blurriness in the image and the recognition of visual obstructions derived therefrom.
Figure 3B:
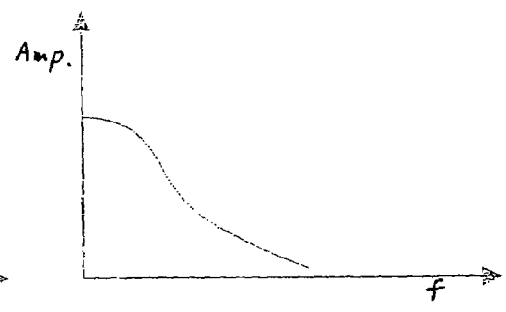

Examples of such a situation are shown in FIGS. 3a and 3b. The curve of the Fourier spectrum is plotted in both figures, the amplitude of the Fourier transformation function being represented by the spatial frequency. FIG. 3a shows a slightly blurry image, while FIG. 3b shows a highly blurry image. It is obvious that the amplitudes at the higher spatial frequency decrease greatly for a blurry image. For evaluation, one exemplary embodiment of the present invention provides that the amplitude and the corresponding spatial frequency are used to recognize values that fall below a threshold value. If this spatial frequency is below a predetermined value, it is assumed that the image is blurry. In another exemplary embodiment, the slope of the curve could also be used here to determine blurriness by comparing it to at least one limiting value. For the evaluation of the Fourier spectrum as well, a value for the magnitude of blurriness may be determined by specifying multiple limiting values or by specifying value ranges, and relaying this value to downstream systems.

Figure 4A:
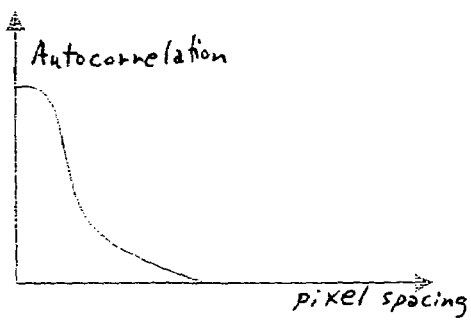
FIGS. 4a and 4b show charts illustrating another exemplary embodiment of the method for determining the blurriness in the image and the recognition of visual obstructions derived therefrom.
Figure 4B:
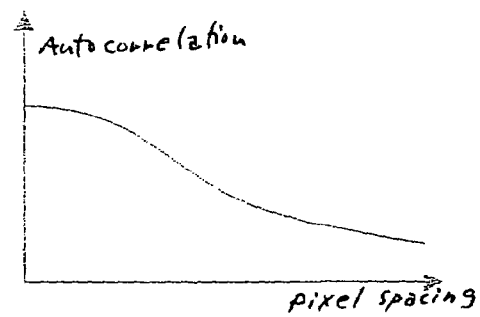

A third possibility for measuring blurriness is the autocorrelation function of the image. This autocorrelation function decreases less steeply for a blurry image than for a sharp image as a function of distance. This is because only large structures remain in a blurry image. FIGS. 4a and 4b illustrate this relationship, the particular magnitude of the autocorrelation function being plotted as a function of the pixel separation. FIG. 4a shows the autocorrelation function for a slightly blurry image, and FIG. 4b shows the autocorrelation function for a highly blurry image. The figures show that as the pixel spacing for an image having a low degree of blurriness (sharp image) increases, the autocorrelation function rapidly decreases, whereas for a blurry image the decrease in the autocorrelation function is less pronounced. As indicated above, for the evaluation it is possible to use at least one limiting value or multiple limiting values being exceeded or not being attained, or, in another exemplary embodiment, to use the calculated average increase to determine the blurriness and/or to determine a value for the magnitude of the blurriness.

A further alternative for measuring blurriness may be provided by an indirect classification formulation in which a learning machine, a neural network or a polynomial classifier, for example, is trained to distinguish between blurry and sharp images by presenting a large number of images as examples.

As mentioned above, a visual obstruction is assumed when a high degree of blurriness is recognized, or the value of the blurriness is greater than a predetermined value. In addition, a comparison to reference distributions for contrasts, Fourier components, or autocorrelations may differentiate various types of visual obstructions based on their similarity to specific reference distributions. In this manner, moisture on the windshield may be distinguished from ice or dust on the windshield, and, depending on the situation, to initiate different countermeasures, for example, activation of the windshield wiper, switching on a windshield heating system or a windshield washer system, etc. Here as well, the above-referenced classification formulation may be provided by learning machines.

If the video sensor having visual obstruction detection is also operated as a rain sensor, further useful applications are possible. If moisture on the windshield is recognized based on the determined blurriness and the contrast distribution, or the Fourier spectrum or autocorrelation, the windshield wiper is, as previously, initially actuated only at the explicit request of the driver, to prevent erroneous start-up when an error is detected. Using the video images which are recorded immediately after the wiping operation, the above-mentioned reference distributions may be obtained, using which a decision is made to initiate the next wiping operation. Thus, the wiping response may be adapted on a situation-specific basis. For situations in which the surrounding scene contains too little contrast, it may be practical to temporarily switch on a windshield light. Visual obstructions are then detectable from the scattering of the light.

What is claimed is:

1. A method for recognizing a visual obstruction using an image sensor associated with a vehicle, comprising:
   recording an image by the image sensor, wherein the image sensor is focused on an external region beyond the vehicle such that a visual obstruction on the vehicle is imaged;
   analyzing the image recorded by the image sensor, wherein at least one of a presence and a type of a visual obstruction is determined by the analysis of the image, wherein the analysis includes measuring a blurriness of at least a portion of the image;
   producing a signal which indicates one of the presence and the type of the visual obstruction; and
   controlling downstream systems based on the signal;
   wherein an analysis of at least one image recorded after an initial wiping operation on a windshield of a motor vehicle is used to determine whether to initiate a next wiping operation, and
   wherein the determination regarding the next wiping operation is based on blurriness of a first image that was recorded immediately after the initial wiping operation in comparison to blurriness of an image recorded subsequent to the first image.

2. The method of claim 1, wherein the at least one of the presence and the type of the visual obstruction is determined by measuring a relative blurriness of different parts of the image.

3. The method of claim 1, wherein the blurriness is measured based on one of a contrast spectrum of the image, a Fourier spectrum, and a autocorrelation function of the image.

4. The method of claim 1, wherein the at least one of the presence and the type of visual obstruction is determined based on a measured distribution of the blurriness by comparison with reference distributions.

5. The method of claim 1, further comprising:
   turning on a windshield light if a scene has a contrast below a predetermined threshold.

6. A device for identifying a visual obstruction, comprising:
   an image sensor for recording an image, wherein the image sensor is focused on an external region beyond the vehicle such that a visual obstruction on the vehicle is imaged; and
   an evaluation unit for analyzing the image recorded by the image sensor;
   wherein the evaluation unit outputs a signal that indicates at least one of a presence and a type of the visual obstruction based on the analysis of the image, wherein the analysis includes measuring a blurriness of at least a portion of the image; and
   wherein the signal is used to control downstream systems, and
   wherein the determination regarding the next wiping operation is based on blurriness of a first image that was recorded immediately after the initial wiping operation in comparison to blurriness of an image recorded subsequent to the first image.

7. The device of claim 6, wherein the downstream systems include at least one of windshield wipers, windshield heating systems, and windshield washer systems.

8. The device of claim 6, wherein the at least one of the presence and the type of the visual obstruction is determined by measuring a relative blurriness of different parts of the image.

9. The device of claim 6, wherein the blurriness is measured based on one of a contrast spectrum of the image, a Fourier spectrum, and a autocorrelation function of the image.

10. The device of claim 6, wherein the at least one of the presence and the type of visual obstruction is determined based on a measured distribution of the blurriness by comparison with reference distributions.

11. The device of claim 6, wherein an analysis of at least one image recorded after an initial wiping operation on a windshield of a motor vehicle is used to determine whether to initiate a next wiping operation.

12. The device of claim 6, further comprising:
    an arrangement to turn on a windshield light if a scene has a contrast below a predetermined threshold.

13. A device for identifying a visual obstruction, comprising:
    an image sensor for recording an image, wherein the image sensor is focused on an external region beyond the vehicle such that a visual obstruction on the vehicle is imaged; and
    an evaluation unit for analyzing the image recorded by the image sensor;
    wherein:
    the evaluation unit outputs a signal that indicates at least one of a presence and a type of the visual obstruction based on the analysis of the image, wherein the analysis includes measuring a blurriness of at least a portion of the image,
    the signal is used to control downstream systems,
    the downstream systems include at least one of windshield wipers, windshield heating systems, and windshield washer systems, the blurriness is measured based on one of a contrast spectrum of the image, a Fourier spectrum, and a autocorrelation function of the image, and an analysis of at least one image recorded after an initial wiping operation on a windshield of a motor vehicle is used to determine whether to initiate a next wiping operation, and wherein the determination regarding the next wiping operation is based on blurriness of a first image that was recorded immediately after the initial wiping operation in comparison to blurriness of an image recorded subsequent to the first image.

14. The device of claim 13, wherein the at least one of the presence and the type of the visual obstruction is determined by measuring a relative blurriness of different parts of the image.

15. The device of claim 13, wherein the at least one of the presence and the type of visual obstruction is determined based on a measured distribution of the blurriness by comparison with reference distributions.

16. The device of claim 13, further comprising:
    an arrangement to turn on a windshield light if a scene has a contrast below a predetermined threshold.

17. A method for recognizing a visual obstruction using an image sensor associated with a vehicle, comprising:
    recording an image by the image sensor, wherein the image sensor is focused on an external region beyond the vehicle such that a visual obstruction on the vehicle is imaged;
    analyzing the image recorded by the image sensor, wherein at least one of a presence and a type of a visual obstruction is determined by the analysis of the image, wherein the analysis includes measuring a blurriness of at least a portion of the image;
    producing a signal which indicates one of the presence and the type of the visual obstruction; and
    controlling downstream systems based on the signal;
    wherein:
    the downstream systems include at least one of windshield wipers, windshield heating systems, and windshield washer systems,
    the blurriness is measured based on one of a contrast spectrum of the image, a Fourier spectrum, and a autocorrelation function of the image, and
    wherein an analysis of at least one image recorded after an initial wiping operation on a windshield of a motor vehicle is used to determine whether to initiate a next wiping operation, and wherein the determination regarding the next wiping operation is based on blurriness of a first image that was recorded immediately after the initial wiping operation in comparison to blurriness of an image recorded subsequent to the first image.

18. The method of claim 17, wherein the at least one of the presence and the type of the visual obstruction is determined by measuring a relative blurriness of different parts of the image.

19. The method of claim 17, wherein the at least one of the presence and the type of visual obstruction is determined based on a measured distribution of the blurriness by comparison with reference distributions.

20. The method of claim 17, further comprising:
    turning on a windshield light if a scene has a contrast below a predetermined threshold.

* * * * *

UNITED STATES PATENT AND TRADEMARK OFFICE
CERTIFICATE OF CORRECTION

| | | |
|---|---|---|
| PATENT NO. | : 7,609,857 B2 | Page 1 of 1 |
| APPLICATION NO. | : 10/501253 | |
| DATED | : October 27, 2009 | |
| INVENTOR(S) | : Matthias Franz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Twelfth Day of October, 2010

David J. Kappos
*Director of the United States Patent and Trademark Office*